Dec. 23, 1952 L. E. SODERQUIST 2,622,274
MOLD MANDREL HANDLING DEVICE
Filed June 2, 1948 6 Sheets-Sheet 1

INVENTOR.
LESLIE E. SODERQUIST
BY
*Ely & Frye*
*Attorneys*

Dec. 23, 1952  L. E. SODERQUIST  2,622,274
MOLD MANDREL HANDLING DEVICE
Filed June 2, 1948  6 Sheets-Sheet 3

INVENTOR.
LESLIE E. SODERQUIST
BY Ely & Frye
Attorneys

Dec. 23, 1952     L. E. SODERQUIST     2,622,274
MOLD MANDREL HANDLING DEVICE
Filed June 2, 1948     6 Sheets-Sheet 4

INVENTOR.
LESLIE E. SODERQUIST
BY
Attorneys

Dec. 23, 1952 L. E. SODERQUIST 2,622,274
MOLD MANDREL HANDLING DEVICE
Filed June 2, 1948 6 Sheets-Sheet 5

INVENTOR.
LESLIE E. SODERQUIST
BY Ely & Frye
Attorneys

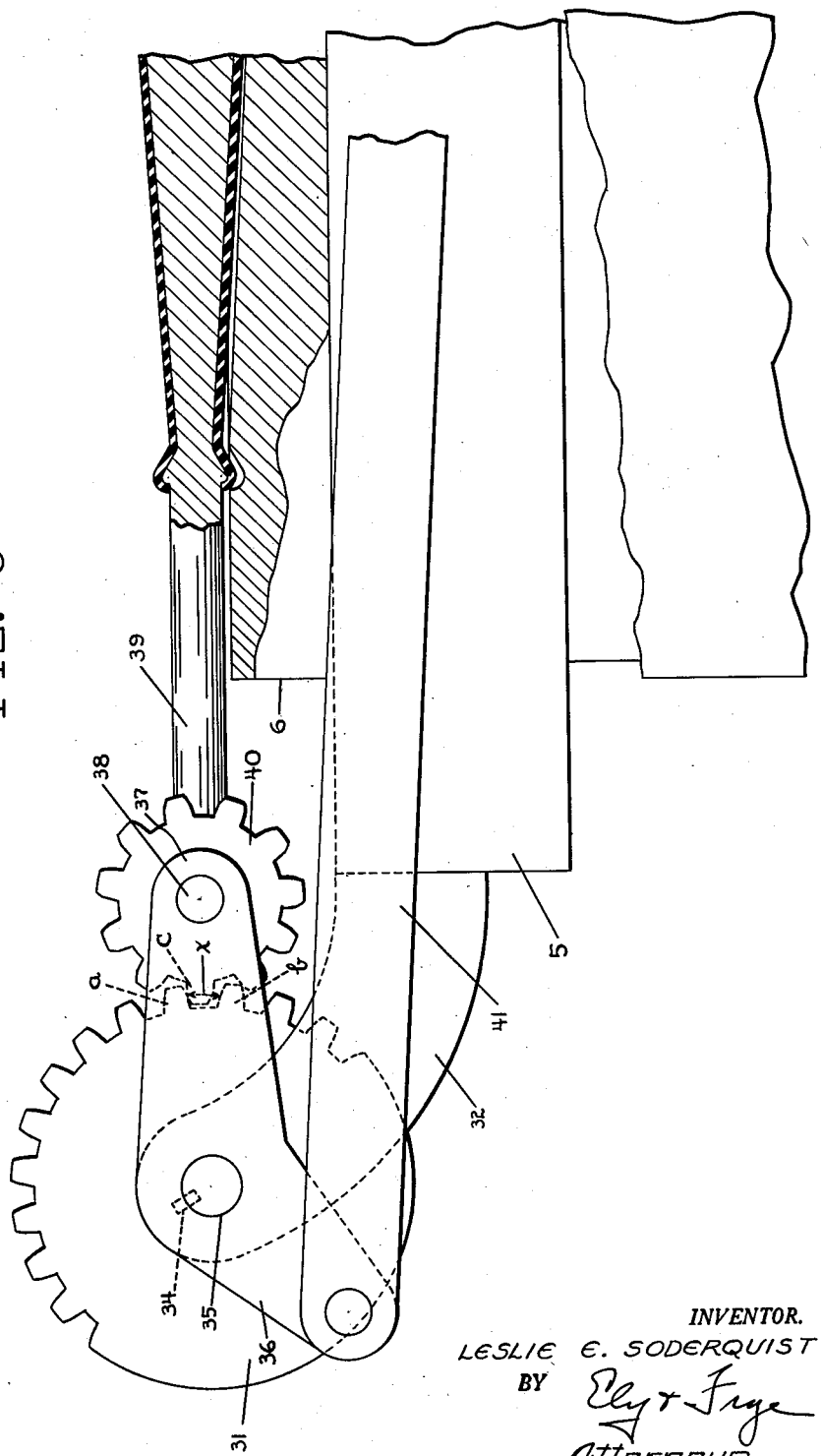

Patented Dec. 23, 1952

2,622,274

UNITED STATES PATENT OFFICE 2,622,274

MOLD MANDREL HANDLING DEVICE

Leslie E. Soderquist, Akron, Ohio, assignor to The McNeil Machine and Engineering Company, Akron, Ohio, a corporation of Ohio Application June 2, 1948, Serial No. 30,703

7 Claims. (Cl. 18—16)

This invention relates to a device for stripping molded articles, of rubber for instance, from their molds, and in particular to articles molded around a core or mandrel, for instance a hot water bag. In forming such an article without seams, uncured rubber is placed in the lower mold section, the mandrel inserted in position and the balance of the rubber is placed above the mandrel. The upper mold section which is usually carried on the movable platen of the press is then closed over the lower mold section and the cure effected under heat and pressure. After curing, the rubber article with the mandrel must be disengaged from the mold, after which the article is stripped from the mandrel. The present invention deals with a mechanism for automatically freeing the cured article while on the mandrel from the mold in response to press opening and, further, to means for removing the mandrel from the mold and shifting into a position where the article may be readily stripped from the mandrel.

In the practical embodiment of the invention shown and described herein, it is used in combination with a mechanical, toggle-action press of the general type shown in my co-pending application, Serial No. 726,912, filed February 6, 1947. In the present device, the mandrel-removing elements are actuated by a cam carried by the main driving gear which actuates the toggle. Briefly stated, the cam acts to remove the mandrel from the mold in a swinging motion through a planetary gear carried by a bellcrank, the other arm of which carries a link which is reciprocated by the cam.

It is an object of the invention, therefore, to provide a device which will automatically operate to remove the mandrel, about which the article is molded, from the mold upon opening of the press and to shift the mandrel into a position convenient to the operator so that he may strip the finished bag from the mandrel.

More particularly, it is an object to attain the foregoing while providing for automatic and positive loosening of the article from the mold prior to removal.

The invention is shown as applied to a multiple cavity mold, several mandrels being mounted for joint operation and, while the invention is shown as adapted to the molding of hot water bottles, it may be extended to other uses.

To these and other ends which will become manifest as the description proceeds, the invention comprises certain embodiments, one preferred form of which is set forth in the accompanying specification and illustrated in the drawings, in which:

Fig. 6 is an enlarged detail showing the initial action of the mandrel-removing mechanism whereby the adhesion of rubber to mold is broken.

Figure 4:
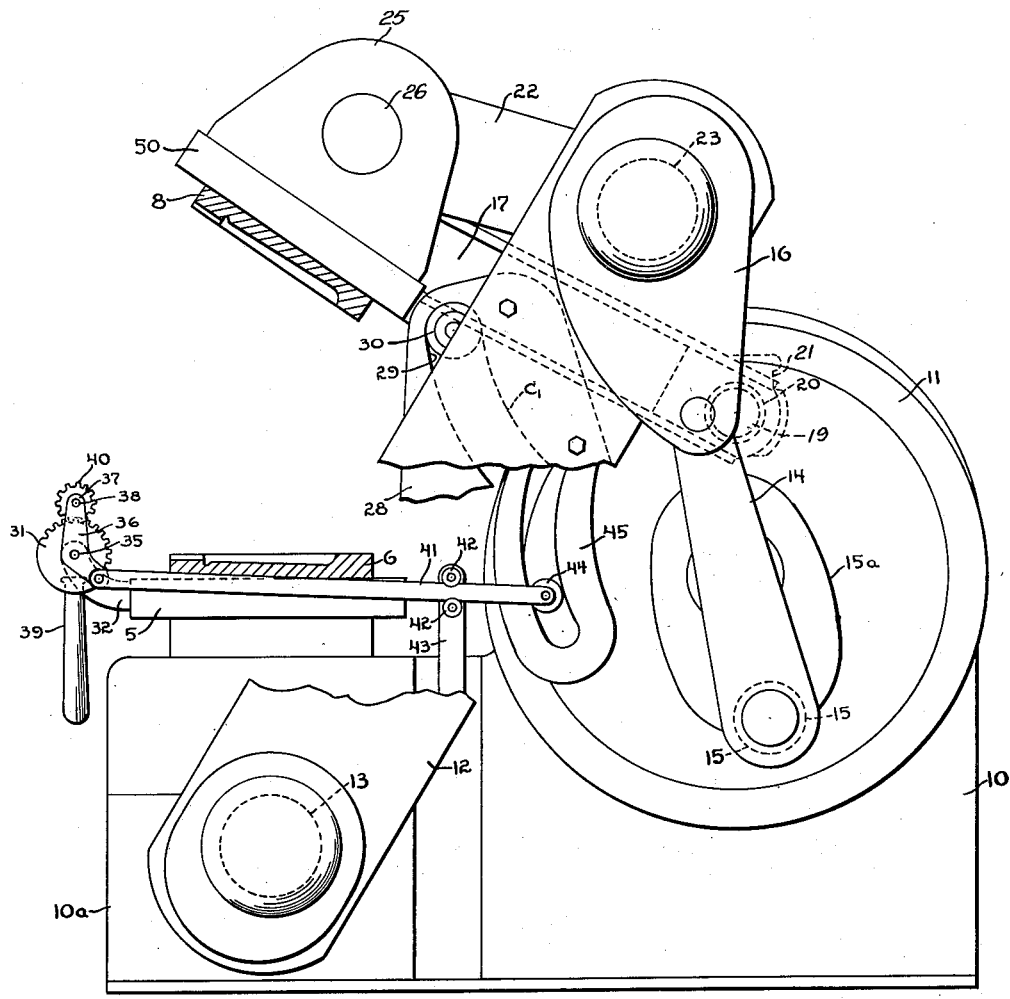
Fig. 4 is a view similar to Fig. 1 with the press jaws fully open and the gang of mandrels in final position of removal.
Figure 5:
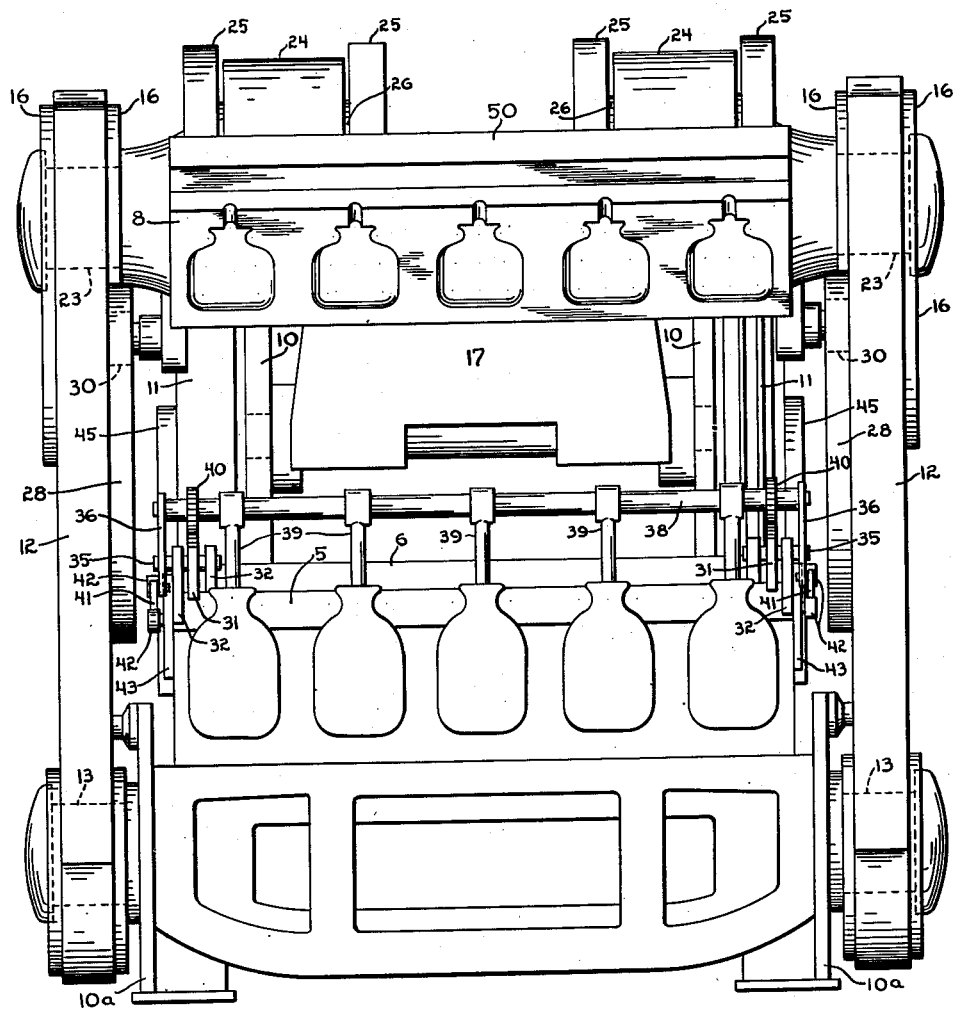
Fig. 5 is a front view of Fig. 4.

Referring to the drawings, there is shown a press having a pair of upright side plates 10 to accommodate the prime mover and associated mechanism for opening and closing the press. Forward extensions 10a of the plates 10 support the lower platen 5 of the press, to which is attached the stationary lower mold section 6 which is provided with the lower mold cavity. A motor M, through appropriate gearing, imparts rotation to the main gears 11 journaled in the side plates 10. Main toggle arms 12 are journaled at 13 in the front plates 10a, and are swung about their pivots by means of links 14. The latter are connected to the gears 11 by journals 15 fixed to crank-arms 15a which are fixed to the gears, and the connected to links 16 fixed to the upper ends of the main arms 12. Upon rotation of the main gear 11 from the position shown in Fig. 4 to that shown in Fig. 1, the arms 12 will be brought to a vertical position under a toggle action between links 15a and 14.

The uprighting of the main arms 12 results in a lowering of the upper platen 50 in the following manner: The upper platen carries the upper mold section 8 and connected to the platen is an arm 17 having forked portions 18 carrying pivots 19 with bearing sleeves 20 which are received in vertically elongated slots 21 near the tops of the side plates 10. A heavy arm or link 22 has a pair of trunnions 23 journaled near the tops of the main arms 12 and has a pair of depending legs 24 each received between a pair of fork members 25, which are integral with the upper platen, and the links are connected to the fork members as by pins 26. It will be seen that as the arm 12 swings, the platen will, in general, be moved in a path arcuate about the pivots 19.

It is desirable that the upper platen move parallel to the lower platen during the final closing movement of the press, and therefore the elongated slots 21 are provided. These alone, however, will not modify the arcuate path of the platen, since the weight of the arm 17 will keep the pivots 19 at the bottom of the slots. Therefore, the cam plates 28, attached to the arms 12, are provided, each plate having a slot 29 in which are received rollers 30 carried by arms 30a extending rearwardly from the upper platen. The slots in the cam plates have two distinct regions of curvature, an upper region C₁ and a lower region $C_2$. The upper region of curvature $C_1$ defines the normal arcuate path of the platen as it swings about pivots 19 when the latter are in the bottoms of slots 21. However, as the rollers reach the region $C_2$ the latter presents an obstruction which would tend to bind the linkages except for the relief afforded by slots 21. The platen and its arm are, therefore, rocked about the rollers 30 and the pivots 19 rise to the top of slots 21. The curvature $C_2$ then defines a path for the rollers whereby the platen is lowered while remaining parallel to the lower platen and the pivots 19 simultaneously descend to the bottom of slots 21.

*The article-removing mechanism*

Short shafts 35 are mounted in the ends of brackets 32 extending from the corners of the lower platen 5. These shafts are prevented from turning in the brackets by keys 34 and to each shaft is fixed a gear 31 which is toothed over approximately one-half of its circumference. The shafts 35 form pivotal supports for two bell-crank levers 36.

Journaled at 37 in the upper arms of bell-cranks 36 is a cross-shaft 38 to which are rigidly attached the gang of cores or mandrels 39. Keyed to the cross-shaft 38 are a pair of pinions 40 in mesh with the fixed gears 31 and bearing a 1:2 ratio thereto. It will be seen that as the bell-crank 36 is swung about shaft 35 there is a planetary movement of the pinions 40 and a resultant augmented swing of the gang-mandrels. Since the pinions 40 bear a 1:2 ratio to the gears 31 and since the mandrel shaft 38 is moved through the same angle as the bell-cranks 36, the mandrels will move through an angle three times the angle swept by the bell-cranks. In particular, to swing the mandrels through 270° to their downwardly depending position shown in Fig. 4, it is only necessary to move the bell-crank through 90°.

Each bell-crank 36 is actuated by a link 41 pivoted to the lower arm thereof, supported between pairs of vertically spaced guide rollers 42 carried on brackets 43 on the frame plates 10a, and having rollers 44 on their rearward ends positioned for engagement by cam tracks 45 fixed to the gears 11.

Figure 1:
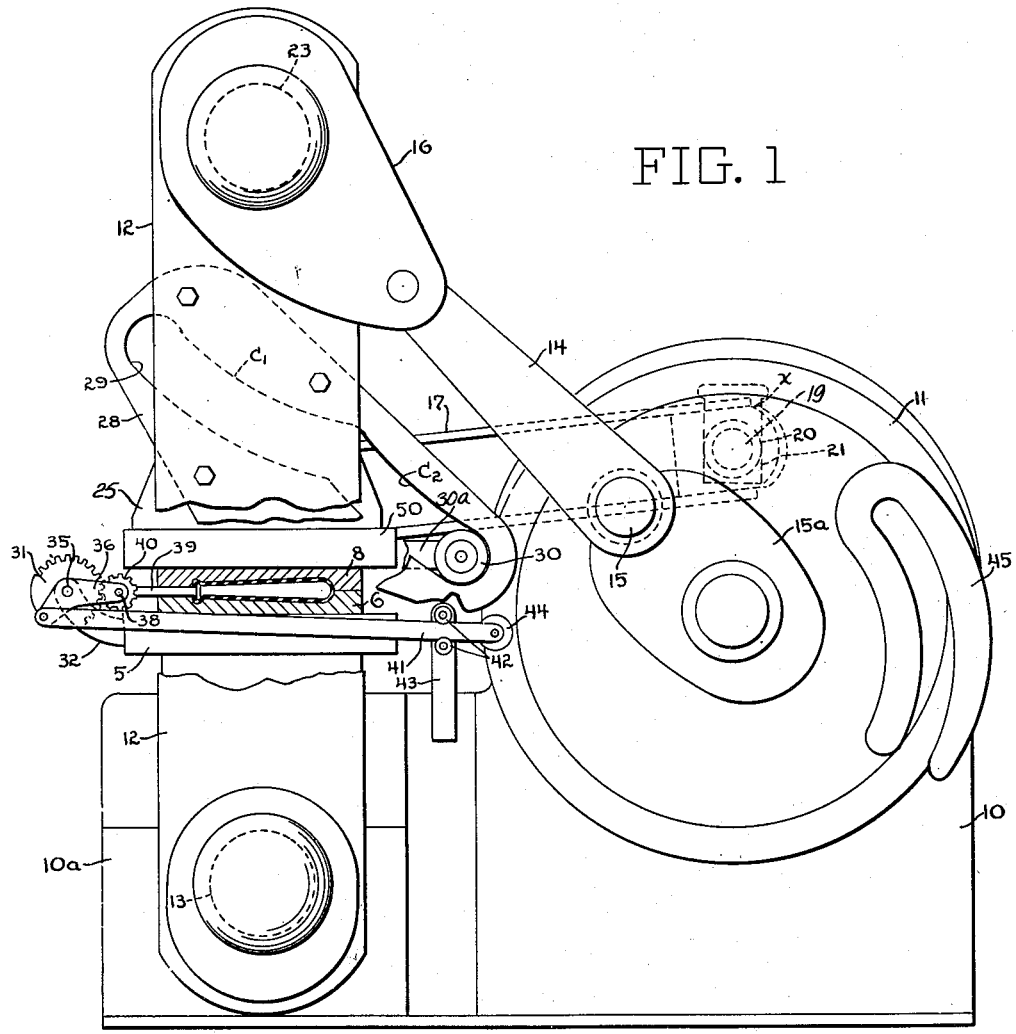
Fig. 1 is a side elevation of a molding press in closed position, and with parts cut away.
Figure 2:
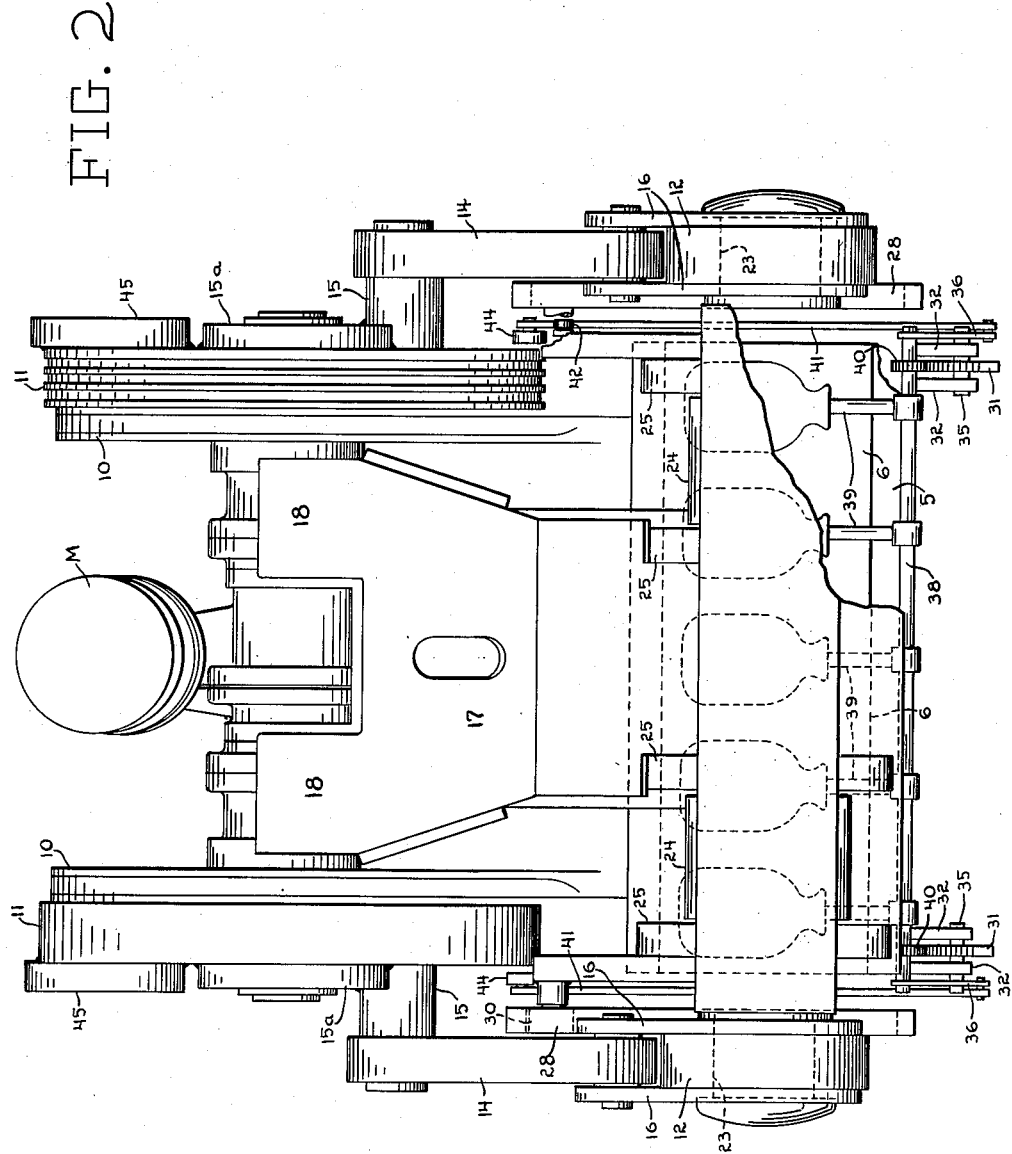
Fig. 2 is a top plan view of Fig. 1.
Figure 3:
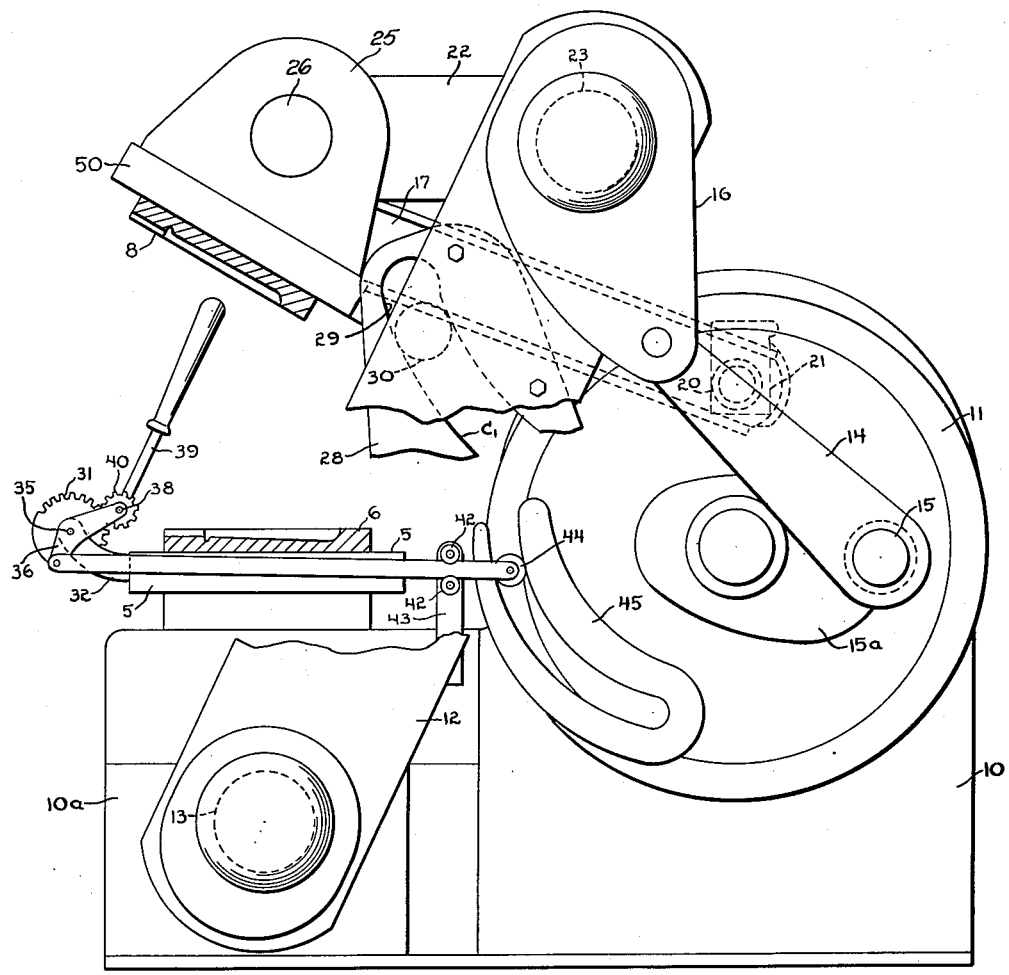
Fig. 3 is a view similar to Fig. 1, with the press partly open and the gang of mandrels raised above the lower mold section.

With the press closed, as in Fig. 1, the cam tracks are about 180° removed from the rollers 44. On clockwise rotation of the gears 11 to open the press, the cam tracks 45 are brought into position to engage the rollers 44 which results in a translation rightwardly of the links 41 and a consequent counter-clockwise turning of the bell-cranks 36 and swinging of the mandrels. The engagement by the cam will be appropriately timed to afford clearance of the mandrels by the upper platen. When brought to the position shown in Fig. 4 the mandrels are in a convenient position in front of the press where the workman may strip the cured articles from the mandrels.

Until the mandrels reach the upward position after 90° of swing, the cam 45 exerts a positive pulling action on the link 41. Thereafter, the cam acts to brake the lowering of the mandrels which tend to fall under the influence of their own weight after pasing top center position.

When the upper mold section is raised to a point where the mandrels may be lifted out of the lower mold section the cams 45 engage the rollers 44 and the mandrel-moving mechanism is actuated. However, if the first movement of the mandrel was a swinging movement about the axis 37, the resistance to movement of the mandrel would be very high and there would be danger of injuring the article. It is advisable therefore to provide some means for stripping the articles progressively from the mold and in the case of hot water bottles it is desirable to first lift the articles at the mouth by a preliminary tilting of the mandrel. The position of the mandrel at the end of the preliminary stripping operation is shown in Fig. 6.

While several mechanical methods might be employed for this purpose, the method which has been selected as the preferred embodiment of the invention is to lift the mandrel by its forward end, or the end adjacent the pivot 37, so that the bottle is progressively stripped, until the article is substantially freed from contact with the lower mold section before the mandrel is rocked about the pivot 38.

By reference to Fig. 6, it will be noted that the distance between the two teeth $a$ and $b$ on the pitch line of each stationary gear 31 at the point where the tooth $c$ of gear 40 is in mesh when the mandrels are in position in the mold, is somewhat greater than the distance between the teeth over the balance of the gear 31. This is indicated by the line $x$ in Fig. 6. When the mold is fully closed about the mandrel as shown in Fig. 1, the mandrel is horizontal and the tooth $c$ rests on the tooth $b$ at the lowermost point in the space $x$.

When, therefore, the bell-crank levers 36 are initially rocked during the opening of the mold, each tooth $c$ moves upwardly until it contacts the underside of the tooth $a$, with the result that the mandrel is tilted as shown in Fig. 6 without rocking, whereby the article is progressively stripped from contact with the lower mold section. After the tooth $c$ contacts tooth $a$, the mandrel is rocked about the axis 38 and conveyed to the position shown in Fig. 4. The mandrel is held in this position while the press is open and the hot water bottle B (or other article) is manually stripped from the stationary mandrel.

The lost-motion connection betwen the gears 31 and 40 also allows a certain freedom of movement of the mandrel on the opening of the mold. This is desirable for, although the molding surfaces of the upper mold section are usually treated so that the article will free itself from that section first, this does not always follow and a certain freedom of movement of the mandrel will aid in opening the press without injury to the article.

Assuming that the articles, such as the water bags, have been cured, the press is started on its opening movement. The first operation is the opening of the mold by the raising of the upper platen. As the press approaches its open position, the cams 45 engage the rollers 44 to actuate the mandrel removing mechanism. In the preferred embodiment of the invention the first movement of the mandrels is a tilting movement which progressively strips the hot water bottles from the lower mold section. Continued opening movement of the press rocks the mandrels about the axis 38 and at the same time shifts them outwardly until they are in vertical position at the front of the press when the press is fully opened. As the mandrels are rigidly held the operator may conveniently strip the finished bags therefrom.

The operator then places sufficient stock in the lower mold section and starts the press on its closing movement. The cam 45 now returns the mandrels to their positions in the mold and at this point the closing movement of the press may be arrested to permit the operator to check that the parts are in their proper position and also to supply such additional stock as may be necessary to fill the mold cavities. When these operations are completed, the press is fully closed.

While a gang of mandrels is shown in this particular embodiment of the invention, it will be evident that the press may be built for the curing or forming of individual hollow articles. Appropriate connections are made for heating the molds on the platens if the press is used for heat treating and forming the articles. While it is preferred to move the upper platen, the invention may be adapted to presses in which the lower platen is moved or to one in which both platens are moved.

While a certain embodiment of the invention has been described, the invention is not limited thereto. The mandrel-removing device may be used with other forms of presses, and the cam may take other forms and be carried otherwise than as shown. Likewise, whereas a particular core and article have been shown, the invention will apply to any process where an article is treated on a core or mandrel and where the two must be removed in such associated conditions prior to final separation. While the press is described as a vulcanizing press for curing articles such as hot water bags made from rubber stocks, it may be used for heat treatment of articles made of plastic materials and for cold pressing and forming articles of all types. I, therefore, do not desire that the invention be deemed as limited except as shall appear from the spirit and scope of the appended claims.

What is claimed is:

1. In a press for forming articles on a core in a separable mold, means for removing the formed article and core comprising a bell-crank lever, an extension on the core pivoted to one arm of the said lever, means responsive to the movement of the press to actuate the other arm of said lever, and means to magnify the angular swing of the core relative to that of the bell-crank.

2. In a press for forming articles on a core, means for removing the formed article and core comprising a bell-crank lever, an extension on the core pivoted to one arm of the said lever, means responsive to the movement of the press to actuate the other arm of said lever, and means to magnify the angular swing of the core relative to that of the bell-crank, said latter means comprising a planetary-motion device.

3. In a press for forming articles on a core, means for removing the formed article and core comprising a bell-crank lever, an extension on the core pivoted to one arm of the said lever, means responsive to the movement of the press to actuate the other arm of said lever, and means to magnify the angular swing of the core relative to that of the bell-crank, said latter means comprising a planetary-motion device with a fixed sun component coaxial with the bell-crank, and a planetary component pivoted in the first-mentioned arm of the bell-crank and fixed to the core extension.

4. A press for forming a hollow article about a mandrel in a mold, said press comprising relatively movable mold sections, a mandrel located between the mold sections when the press is closed, an extension on the mandrel passing between and beyond the mold sections, a shaft to which said extension is secured, and means operative after the mold sections are separated to move the shaft to tilt the mandrel with respect to a mold section and then to rotate the shaft.

5. A press for forming a hollow article about a mandrel in a mold, said press comprising relatively movable mold sections, a mandrel located between the mold sections when the press is closed, an extension on the mandrel passing between the mold sections, a shaft to which said extension is secured, and means operative after the mold sections are separated to move the shaft to tilt the mandrel with respect to a mold section, then to rotate the shaft and at the same time to shift it to a position remote from the mold sections.

6. A press for molding a hollow article comprising platens, a mold section attached to each platen, a core between the mold sections around which the article is formed, a rigid support for the core extending outwardly beyond the mold sections, a pivoted crank on the outer end of which the support is pivotally mounted, a pinion fixed to the support, a stationary rack over which the pinion travels during the movement of the support, means to move one of the platens to open and close the mold, a cam movable with the platen moving means and connection between the cam and the crank to rock the crank and raise the core out of the mold and return it to the mold, said cam being active only when the platen approaches the end of its opening movement and begins its closing movement.

7. A press for molding a hollow article comprising platens, a mold section attached to each platen, a core between the mold sections around which the article is formed, a rigid support for the core extending outwardly beyond the mold sections, a pivoted crank on the outer end of which the support is pivotally mounted, a pinion fixed to the support, a stationary rack over which the pinion travels during the movement of the support, means to move one of the platens to open and close the mold, a cam movable with the platen moving means and connection between the cam and the crank to rock the crank and raise the core out of the mold and return it to the mold, said cam being active only when the platen approaches the end of its opening movement and begins its closing movement, said pinion and rack having provision for lost motion at the beginning of the core raising movement.

LESLIE E. SODERQUIST.

REFERENCES CITED

The following references are of record in the file of this patent:

UNITED STATES PATENTS

| Number | Name | Date |
| --- | --- | --- |
| 1,648,649 | Louthan | Nov. 8, 1927 |
| 1,688,417 | Grubman | Oct. 23, 1928 |
| 1,971,849 | Brundage | Aug. 28, 1934 |
| 1,989,364 | Iverson | Jan. 29, 1935 |
| 2,033,036 | Korsmo | Mar. 3, 1936 |
| 2,104,620 | Long | Jan. 4, 1938 |
| 2,124,529 | Lester et al. | July 26, 1938 |
| 2,325,752 | Dodge | Aug. 3, 1943 |
| 2,354,447 | Allen | July 25, 1944 |
| 2,567,649 | Morin | Sept. 11, 1951 |

FOREIGN PATENTS

| Number | Country | Date |
| --- | --- | --- |
| 81,540 | Germany | June 10, 1895 |